(12) United States Patent
Dunsworth

(10) Patent No.: US 6,289,873 B1
(45) Date of Patent: Sep. 18, 2001

(54) SYSTEM AND METHOD FOR CONTROLLING AN ENGINE DURING A BOG CONDITION

(75) Inventor: Vince Dunsworth, Edinboro, PA (US)

(73) Assignee: General Electric Company

(*) Notice: Subject to any disclaimer, the term of this patent is extended or adjusted under 35 U.S.C. 154(b) by 0 days.

(21) Appl. No.: 09/563,467

(22) Filed: May 2, 2000

(51) Int. Cl.[7] .................................................. F02D 41/14
(52) U.S. Cl. .......................................................... 123/352
(58) Field of Search .................................. 123/352–357; 180/179; 701/110

(56) References Cited

U.S. PATENT DOCUMENTS

| | | | |
|---|---|---|---|
| 5,329,455 | * | 7/1994 | Oo et al. .......................... 123/352 X |
| 5,553,589 | * | 9/1996 | Middleton et al. .................. 123/352 |
| 5,826,563 | | 10/1998 | Patel et al. . |
| 6,092,504 | * | 7/2000 | Barnes et al. ........................ 123/357 |

* cited by examiner

Primary Examiner—Tony M. Argenbright
(74) Attorney, Agent, or Firm—Carl A. Rowold, Esq.; Beusse Brownlee Bowdoin & Wolter PA; Enrique J. Mora, Esq

(57) ABSTRACT

A system and method for controlling operation of an engine during a bog condition is provided. The method allows for monitoring values of a commanded engine RPM signal and of an actual engine RPM signal. The method further allows for determining whether the difference between respective values of the commanded engine RPM signal and the actual engine RPM signal exceeds a predetermined threshold RPM value. An inflection determining step allows for continuing to monitor values of the actual engine RPM signal to determine an inflection RPM point. A varying step allows for controllably varying the commanded engine RPM signal from a predetermined point about the inflection RPM point towards a desired commanded speed value.

26 Claims, 3 Drawing Sheets

SYSTEM AND METHOD FOR CONTROLLING AN ENGINE DURING A BOG CONDITION

BACKGROUND OF THE INVENTION

The present invention relates generally to operation of compression ignition engines that may be used in various machines, such as locomotives, marine vessels, etc., and, more particularly the present invention is related to controlling engine operation during a bog condition.

Large self-propelled traction vehicles such as locomotives commonly use a diesel engine to drive an electrical system comprising generating means for supplying electric current to a plurality of traction motors, such as alternating current or direct current (dc) motors whose rotors are drivingly coupled to the respective axle-wheel sets of the vehicle. The generating means typically comprises a main 3-phase traction alternator whose rotor is mechanically coupled to the output shaft of the engine (typically a 16-cylinder turbocharged diesel engine). When excitation current is supplied to field windings on the rotating rotor, alternating voltages are generated in the 3-phase stator windings of the alternator. These voltages are rectified and, in the case of DC traction motors, applied to the armature windings of the traction motors, or, in the case of AC traction motors, applied to inverters for suitable variable frequency conversion prior to being applied to energize such AC motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output. But the load on the engine must not exceed whatever level of power the engine can develop. Overloads can cause premature wear, engine stalling or "bogging," or other undesirable effects. Historically, locomotive control systems have been designed so that the operator can select the desired level of traction power, in discrete steps between zero and a maximum level, so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. In addition to the eight conventional power notches, the handle has an "idle" position.

The position of the throttle handle determines the engine speed setting of the associated governor. In a typical electronic fuel injection governor system, the output excitation from a controller drives individual fuel injection pumps for each cylinder allowing the controller to individually control start of and duration of fuel injection for each cylinder. The governor compares the commanded speed (as commanded by the throttle) with the actual speed of the engine, and it outputs signals to the controller to set fuel injection timing to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (hp) (e.g., 4,000 hp) are realized. Under normal conditions, the engine power at each notch equals the power demanded by the electric propulsion system which is supplied by the engine-driven main alternator plus power consumed by certain electrically and mechanically driven auxiliary equipment.

The output power (KVA) of the main alternator is proportional to the product of the rms. magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit, it is common practice to adjust the field strength of the traction alternator to compensate for load changes (traction motor loading and/or auxiliary loading) and minimize the error between actual and desired KVA. The desired power depends on the specific speed setting of the engine. Such excitation control will establish a balanced steady-state condition which results in a substantially constant, optimum electrical power output for each position of the throttle handle.

As suggested above, under normal operating conditions, the RPM of the engine is closely regulated. Unfortunately, under certain anomalous conditions, such as may occur due to a temporary overload or failure of a speed sensor that senses actual engine RPM, the engine could loose its speed regulation, that is, engine RPM would drop far below commanded engine RPM. The above-described condition is generally referred to as a bog. In a bog condition, the drop in engine RPM results in a large engine RPM error that demands a maximum amount of available fuel. In the case of a controller that uses a proportional plus integral (PI) control loop, the gain of the integrator during the bog condition may wind up to a maximum value so that, when the cause of the bog is removed, the engine, due to excess fuel and/or high gain in its control loop, may accelerate very rapidly (e.g., in excess of 100 RPM/second), and such high acceleration results in undesirable stresses and wear on various rotating components of the locomotive, e.g., cycle skippers, fans, etc. Further, the high acceleration may cause a drastic disturbance on the electrical system of the locomotive. That disturbance results in undesirable electrical transients on the various components and control panels interconnected to the electrical system. Additionally, the high acceleration could result in engine speed overshoot on recovery.

Thus, it would be desirable to provide a control system and method that would allow for a graceful recovery of engine speed and load during and subsequent to a bog condition. It would be further desirable to reduce the magnitude of transients that various components of the locomotive have generally encountered during bog conditions.

SUMMARY OF THE INVENTION

Generally speaking, the present invention fulfills the foregoing needs by providing a method for controlling operation of an engine during a bog condition. The method allows for:

monitoring values of a commanded engine RPM signal;

monitoring values of an actual engine RPM signal;

determining whether the difference between respective values of the commanded engine RPM signal and the actual engine RPM signal exceeds a predetermined threshold RPM value;

continuing to monitor values of the actual engine RPM signal to determine an inflection RPM point; and controllably varying the commanded engine RPM signal from a predetermined point about the inflection RPM point towards a desired commanded speed value.

The present invention may further fulfill the foregoing needs by providing in one exemplary embodiment a control system for controlling operation of an engine during a bog condition. The system includes a sensor coupled to sense values of a commanded engine RPM signal and a sensor coupled to sense values of an actual engine RPM signal. The system further includes a subtractor coupled to receive the respective sensed values of the actual and the commanded engine RPM signals to generate an output signal indicative of the difference between the commanded engine RPM signal the actual engine RPM signal. A comparator is coupled to receive the output signal from the subtractor and a predetermined threshold RPM value to determine whether the value of the output signal from the subtractor exceeds the predetermined threshold RPM value. A module is coupled to receive the respective values of the actual engine RPM signal to determine a minimum RPM point reached during the bog condition, and a control module is configured to controllably vary the commanded engine RPM from a predetermined point about the minimum RPM point towards a desired commanded speed.

Figure 1:
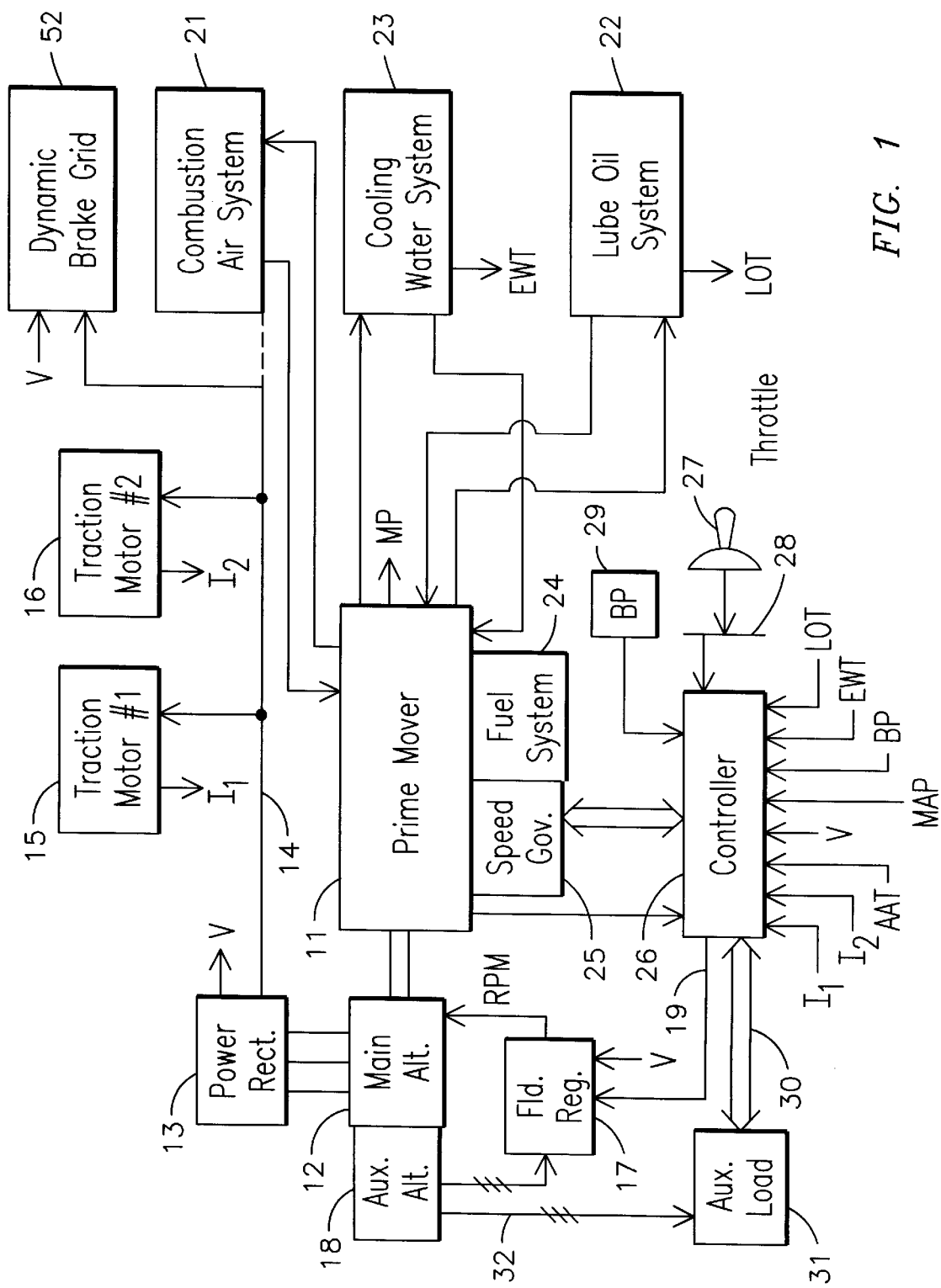
FIG. 1 shows a schematic diagram of an exemplary locomotive including a thermal prime mover, such as a diesel engine and associated components that may benefit from the control system and techniques of the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Referring now to FIG. 1, there is shown an exemplary functional block diagram of a locomotive propulsion system including a variable speed prime mover 11 mechanically coupled to drive a three-phase alternating current (AC) synchronous generator 12, also referred to as a main traction alternator. The three-phase voltages generated by the alternator 12 are applied to AC input terminals of at least one three-phase, bi-directional uncontrolled power rectifier bridge 13. In the event the locomotive utilizes DC traction motors 15 and 16 for driving the wheels of the locomotive, then the rectified electric power output of the bridge 13 is supplied via a DC bus 14 to the parallel connected armature windings of the traction motors 15, 16. While only two motors, 15 and 16 are shown, in practice, a traction motor is supplied for each axle of a locomotive and there are typically two to three axles per truck with two trucks per locomotive so that a conventional locomotive may have from four to six traction motors. If the traction motors are AC rather than DC motors, the DC bus 14 is typically connected to a controlled inverter (not shown) which supplies variable frequency power to the AC motors. It will be appreciated that the techniques and control system of the present invention for providing engine control during a bog condition may be readily implemented regardless of the specific type of traction motor used by the locomotive.

Figure 2:
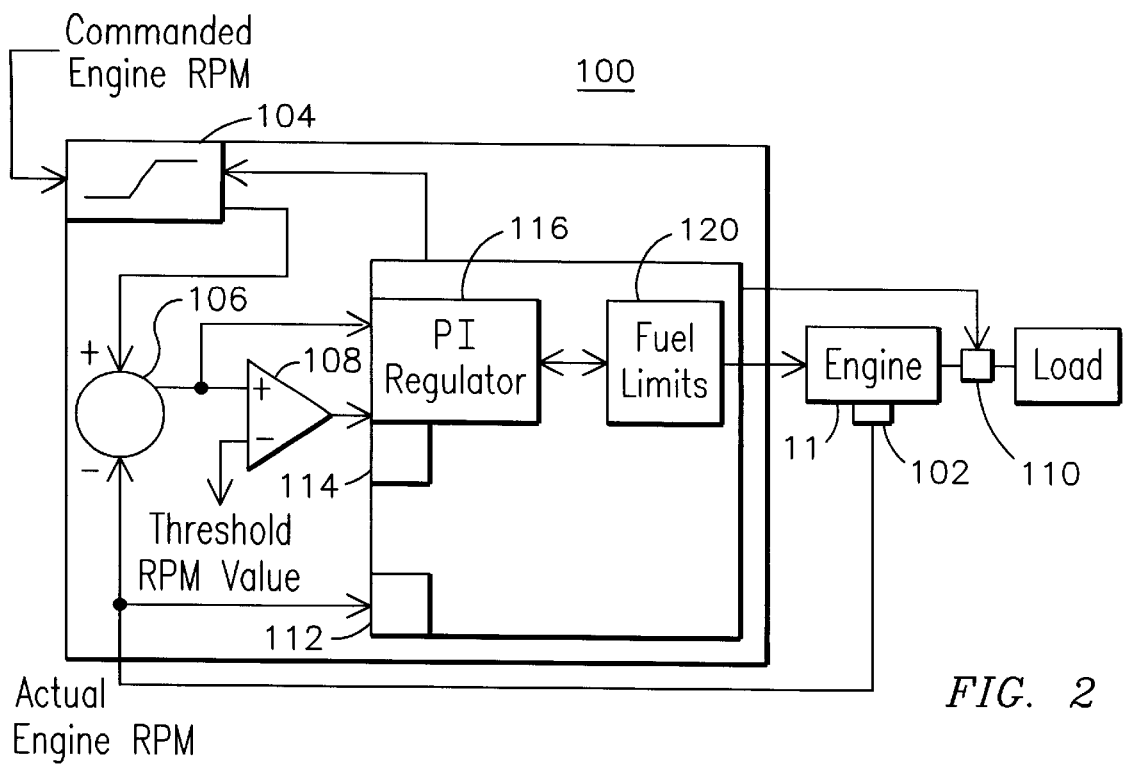
FIG. 2 shows a block diagram schematic of an exemplary control system that embodies the present invention and allows for engine control during a bog condition.

The prime mover 11 is a thermal or internal combustion engine and is typically a high horsepower, turbocharged, four stroke, 16 cylinder diesel engine. It will be appreciated that the present invention is not limited to any of the foregoing exemplary engine characteristics. For example, the engine need not be a 16 cylinder engine nor need the engine be limited to four stroke implementations being that a two stroke implementation and engines having a different number of cylinders could readily benefit from the present invention. Such an engine has a number of ancillary systems that are represented by the labeled blocks in FIG. 1. A combustion air system 21 conventionally includes an engine exhaust gas driven turbocharger for compressing air in the combustion air intake manifold of the engine. A lube oil system 22 conventionally includes an engine crankshaft driven pump and associated piping for supplying suitable lubricating oil to the various moving parts of the engine. A cooling water system 23 conventionally includes a pump for circulating relatively cool water from a plurality of air cooled heat exchangers or radiators to a lube oil cooler, to the cylinder liners of the engine for absorbing heat rejected during the combustion process, and also to intercoolers through which the combustion air passes after being compressed by the turbocharger. Still further, the diesel engine includes a fuel system 24 comprising a fuel tank, fuel pumps and nozzles for injecting fuel oil into the respective power cylinders which are arranged in two rows or banks on opposite sides of the engine. Tappet rods cooperate with fuel cams on a pair of camshafts for actuating the respective fuel injectors at the proper times during each full turn of the engine camshaft. The electronic fuel injector controller then controls start of and duration of fuel flow into a cylinder each time the associated injector is actuated. The excitation of each fuel pump solenoid, and hence the quantity of fuel that is being supplied to the engine, is controlled by output signals from the engine speed governor system 25. While shown separately, the electronic fuel controller governor 25 may be incorporated in a controller 26. The governor regulates engine speed by automatically controlling fuel flow within predetermined limits in a direction and by an amount that minimizes any difference between actual and desired speeds of the engine crankshaft. The fuel limits may be stored in a suitable memory unit 120, as shown in FIG. 2. The commanded engine RPM value may set by a variable speed control signal received from controller 26, which signal is generally called a speed or RPM command signal, or speed or RPM call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle. N1 corresponds to the minimum desired engine speed or power, while N8 corresponds to maximum speed and full power. In a consist of two or more locomotives, only the lead unit is usually attended and the controller on board each trail unit will receive, over a train line 28, an encoded signal that indicates throttle position selected by the operator in the lead unit.

For each power level of the engine there is a corresponding desired load. The controller 26 is arranged to translate the throttle notch information into a control signal of appropriate magnitude on the input line 19 of the alternator field regulator 17, whereby the traction power is regulated to match the called-for power so long as the alternator output voltage and load current are both within predetermined limits. For this purpose, it is necessary to supply the controller 26 with information about various operating conditions and parameters of the propulsion system, including the engine and its support systems. More particularly, the controller 26 typically receives voltage and current feedback signals representative of the power supplied to the traction motors and a load control signal issued by the governor system 25 if the engine cannot develop the power demanded and still maintain the called-for speed. The controller also receives an engine speed signal RPM indicating the rotational speed of the engine crankshaft and ambient air pressure signal BP from a barometric pressure sensor 29, an intake manifold air pressure signal MAP from a pressure sensor associated with an air intake manifold at the engine, and oil temperature signal LOT from a temperature sensor on the hot oil side of the lube oil cooler, and a water temperature signal EWT from a temperature sensor in a hot water section of the cooling water system 23 and an ambient air temperature signal AAT from an appropriate temperature sensor. The controller uses the signal EWT to control radiator fan motors that control the flow of air across the heat exchange tubes of the radiators so as to maintain a relatively constant engine operating temperature over the load range of the engine and with wide variations in ambient temperature.

The above listing is representative of the signals which are applied to the controller 26 in known fashion to enable the controller to properly set the fuel control to the engine 11 so as to regulate the power output of the engine to meet the requirements of the locomotive and any auxiliary equipment coupled to the locomotive. While each cylinder of the engine has its own individually controllable fuel injector, typical operation of the engine is to supply the same control signal from the controller 26 to each fuel injector such that the amount of fuel injected into each cylinder of the engine is the same for each cylinder. Thus, it will be appreciated that controller 26 provides substantially reliable and accurate engine RPM control, but, as suggested above, there may be anomalous conditions that may result in instances where such control may be temporarily lost, that is, bog conditions. In particular, the present invention addresses control recovery during such bog conditions.

FIG. 2 illustrates an exemplary embodiment of a control system 100 that embodies the present invention and may be incorporated in controller 26 (FIG. 1). It will be shown that control system 100 allows for detecting the occurrences of bog conditions and further allows for graceful recovery, that is, controlled recovery from such bog conditions. It will be appreciated that the various modules of control system 100 may comprise software modules executed by a microprocessor or digital signal processor. However, it will be understood that the present invention need not be limited to software modules since the same operational interrelationships executed by the software modules may be implemented by hardware modules. As shown in FIG. 2, a sensor 102 allows for sensing and monitoring values of actual engine RPM. As suggested above, throttle 27 (FIG. 1) may include a potentiometer or other suitable sensor for sensing each notch position so as to determine values of commanded engine RPM. The signal indicative of commanded engine RPM may be supplied to a reference speed ramp generator 104 whose output in steady-state conditions corresponds to the commanded engine RPM values. A subtractor 106 receives the output signal from ramp generator 104 and the signal indicative of actual engine RPM to generate an output signal that represents the arithmetic difference between a respective commanded engine RPM value and a respective actual engine RPM value. The output signal from subtractor 106 is supplied to a comparator 108 for determining whether the value of the output signal from subtractor 106 exceeds a predetermined threshold RPM value. In one exemplary embodiment, the value of the threshold RPM was chosen to be equal to 50 RPM, that is, if the difference between actual engine RPM and commanded engine RPM exceeds or is equal to fifty RPM, then a bog condition is declared. For example, a fault signal indicative of such bog condition may be logged into a suitable on-board monitoring system that may keep historical track of faults that may be generated from time to time by the various systems of the locomotive. It will be appreciated that values other than 50 RPM may be selected for the threshold RPM value depending on how tightly or loosely the designer desires to provide such a threshold for determining the bog condition.

Figure 3:
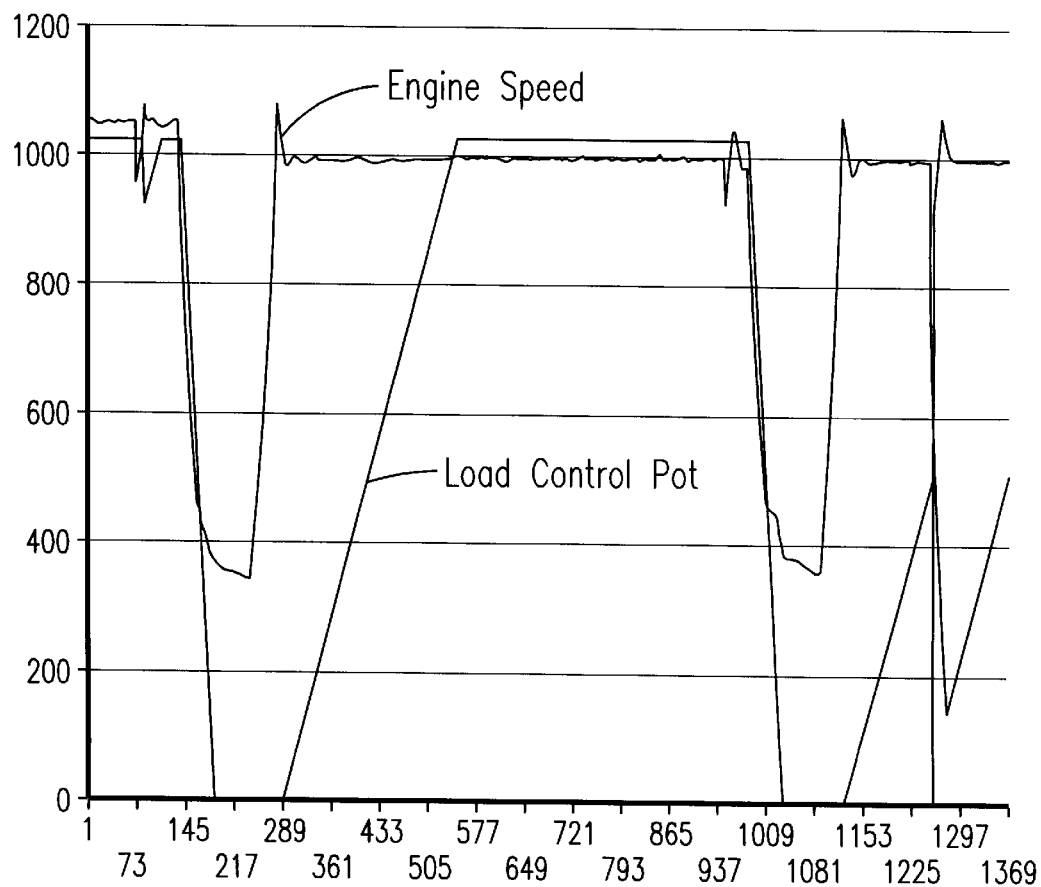
FIG. 3 shows exemplary waveforms as may be generated during an uncontrolled bog condition, and that may result in undue stresses to various of the components illustrated in FIG. 1 due to high engine RPM errors.
Figure 4:
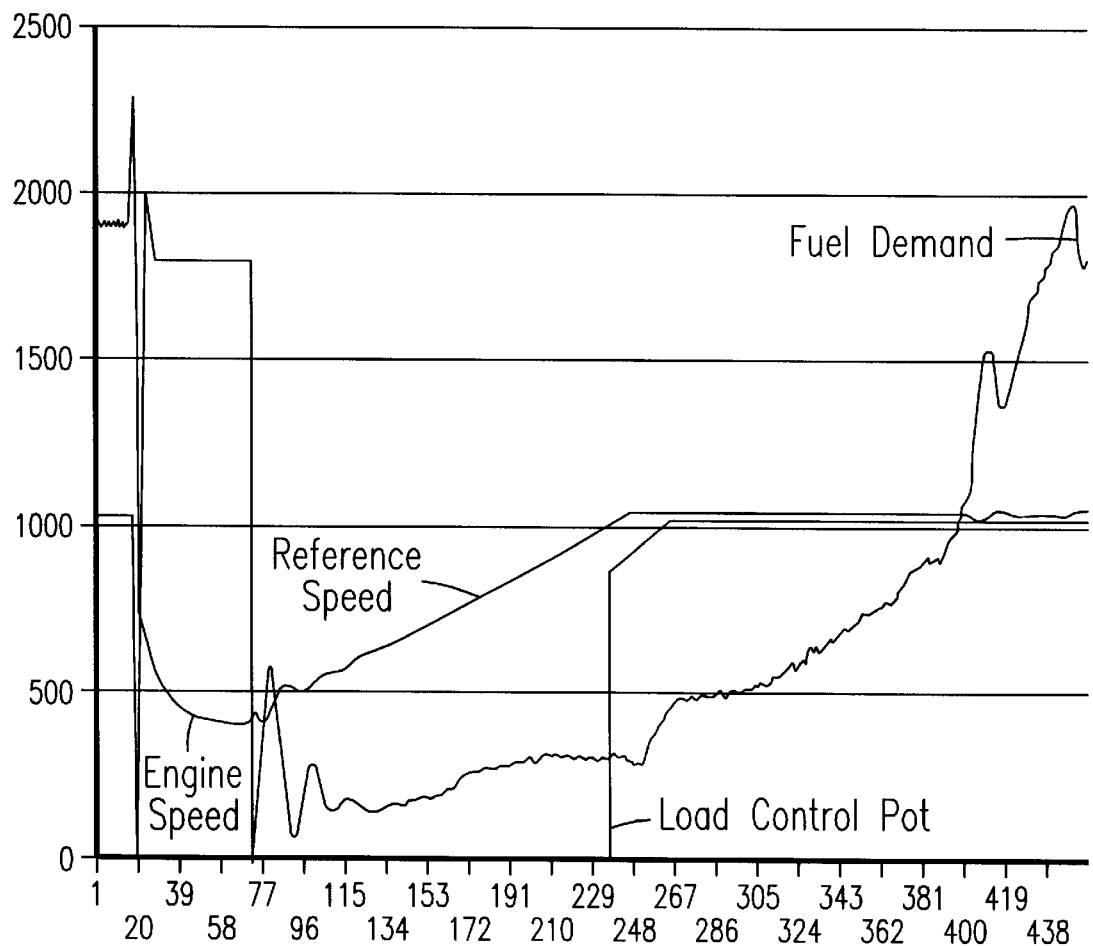
FIG. 4 shows exemplary waveforms as may be generated when using the control system of FIG. 2 and allows for graceful recovery from a bog condition that, if left uncontrolled, would result in the undesirable waveforms show in FIG. 3.

Once a bog condition has been determined, a load control module 110 may receive a signal (LOAD_CONTROL_POT) from control system 100 for disengaging or shedding engine load to a predetermined fraction of a full load rating. Typically, the LOAD_CONTROL_POT signal is set to zero upon the control system determining that a bog condition is occurring. Control system 100 further includes a module 110 for determining an inflection or minimum RPM point reached by the signal indicative of actual engine RPM during the bog condition. As will be understood by those skilled in the art, and as shown in FIG. 3, in a typical bog condition, actual engine RPM will initially rapidly decelerate to a minimum value and then will rapidly accelerate, (e.g., upwards of 100 RPM/SEC). Once such minimum or inflection point as been determined by module 112, the present invention, as shown in FIG. 4, allows for a controlled recovery as opposed to the uncontrolled acceleration shown in FIG. 3. In particular, ramp generator module 104 allows for controllably varying the commanded engine RPM signal from a predetermined initial ramp value located about the inflection or minimum RPM point towards a desired commanded speed. For example, assuming the inflection point is 400 RPM, then upon the actual engine RPM signal continuing to increase or recover within a predetermined band about the inflection point, e.g., a recovery band of 20 RPM about the inflection point, then reference speed generator 104 may be set to 420 RPM to then allow recovery at a predetermined RPM slew rate towards the desired commanded speed, e.g., 1050 RPM.

As suggested above, control system 100 may further include a PI regulator 116 using control techniques well understood by those of ordinary skill in the art. As suggested above, in lieu of allowing the integrator gain to wind up to its maximum value, a module 114 allows for setting the gain of the integrator in regulator 116 to a value consistent with expected engine load during bog recovery, e.g., such gain may be set equal to zero assuming the value LOAD_CONTROL_POT is set to zero. It will be appreciated, however, that the present invention is not limited to setting such integrator gain equal to zero since other relatively small values for the integrator gain could be used. In this case, instead of fuel system 24 (FIG. 1) being only restrained by the fuel limits stored in memory 120, fuel system 24 will be commanded by control system 100 to supply a controlled amount of fuel corresponding to the predetermined RPM slew rate supplied by ramp generator 104, as opposed to the virtually uncontrolled acceleration suffered prior to the present invention during an uncontrolled bog condition. Once the actual engine RPM and commanded engine RPM have recovered within acceptable limits, the LOAD_CONTROL_POT signal may be set in load control module 110 to reengage engine load.

Figure 5:
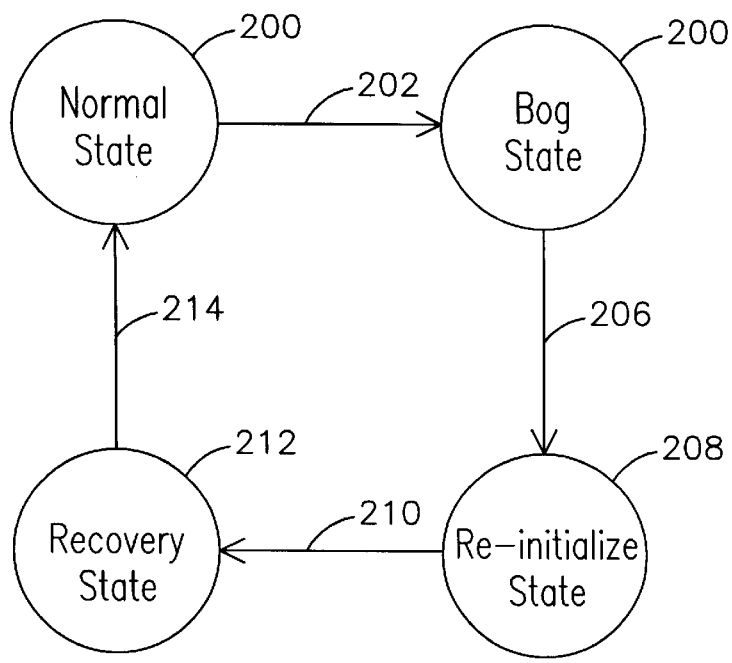
FIG. 5 shows an exemplary state diagram representation of the control system of FIG. 2.

FIG. 5 depicts exemplary respective states and state transitions that may be executed by control system 100 (FIG. 2) during bog detection and recovery. As will be appreciated by those skilled in the art, a normal state 200 may correspond to the engine running normally, that is, the LOAD_CONTROL_POT signal is determined using any standard control technique in fashion well-understood by those skilled in the art. More particularly, in normal state 200 bog control recovery is not active since no bog condition has been detected. As shown in FIG. 5, state transition 202 allows for transitioning from normal state 200 to a bog state 204 when the engine speed error, that is, the difference between commanded and actual engine RPM, is greater than a threshold RPM value, e.g., 50 RPM. It should be understood that the actual threshold value may vary depending on any given locomotive application.

As suggested above, control system 100 (FIG. 2) in bog state 204 may command the level of the LOAD_CONTROL_POT signal to zero or other relatively small value, that is, control system commands to shed load from the engine. Further, in bog state 204, the control system continues to monitor engine speed to keep track of the lowest engine speed actually reached by the engine during the bog condition. State transition 206 allows for transitioning from bog state 204 to a re-initialize state 208. Such transition may occur when the engine speed has recovered to a predetermined RPM value greater than the lowest speed reached, e.g., about 20 RPM greater than the lowest speed reached. As discussed above in the context of FIG. 4, the lowest speed corresponds to an inflection point in the plot of engine speed as a function of time during the bog condition. Re-initialize state 208 allows for setting the value of the loop integrator gain to zero or other relatively small value consistent with expected engine load during bog recovery. Further, the reference speed ramp generator may be set to the predetermined engine speed recovery value, e.g., 420 RPM assuming the inflection point is 400 RPM and the predetermined recovery RPM value above the inflection point is 20 RPM. Alternatively, the minimum engine speed or values within a recovery band near the inflection point could be used. Thus, assuming the same exemplary values listed above, the recovery band may comprise values ranging from about 400 RPM to about 420 RPM. State transition 210 allows for transitioning from re-initialize state 208 to recovery state 212. For example, state transition 210 may be executed upon the integrator gain being set to zero or other small value, then the commanded engine speed may be ramped to a desired value for commanded speed at a slew rate controlled by the ramp generator. In recovery state 212, load may still continue to be shed from the engine. State transition 214 allows for transitioning from recovery state 212 to normal state 200 upon determining that the speed error is within an acceptable limit, e.g., when the value of speed error<20 RPM.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling operation of an engine during a bog condition, the method comprising the steps of:
   monitoring values of a commanded engine RPM signal;
   monitoring values of an actual engine RPM signal;
   determining whether the difference between respective values of the commanded engine RPM signal and the actual engine RPM signal exceeds a predetermined threshold RPM value;
   continuing to monitor values of the actual engine RPM signal to determine an inflection RPM point; and
   controllably varying the commanded engine RPM signal from a predetermined point about the inflection RPM point towards a desired commanded speed value.

2. The method of claim 1 wherein the varying of the commanded engine RPM signal is executed at a predetermined slew rate.

3. The method of claim 1 further comprising de-engaging engine load upon determining that the difference between the commanded engine RPM signal and the actual engine RPM signal exceeds the predetermined threshold RPM value.

4. The method of claim 1 further comprising declaring a bog condition upon determining that the difference between the commanded engine RPM signal and the actual engine RPM signal exceeds the predetermined threshold RPM value.

5. The method of claim 1 wherein controlling actual engine RPM relative to the commanded engine RPM comprises executing a proportional plus integral control loop.

6. The method of claim 5 further comprising the step of setting a respective gain in the proportional-plus-integral control loop to a value consistent with expected engine load during bog recovery.

7. The method of claim 6 wherein the respective gain set in the control loop is a respective integrator gain.

8. The method of claim 3 further comprising re-engaging engine load upon the difference between the actual engine RPM signal and the commanded engine RPM signal being restored to within a predetermined acceptable range.

9. A control system for controlling operation of an engine during a bog condition, the system comprising:
   means for monitoring values of a commanded engine RPM signal;
   means for monitoring values of an actual engine RPM signal;
   means for determining whether the difference between respective values of the commanded engine RPM signal and the actual engine RPM signal exceeds a predetermined threshold RPM value;

means for determining an inflection RPM point in the actual engine RPM signal; and means for controllably varying the commanded engine RPM signal from a predetermined point about the inflection RPM point towards a desired commanded speed.

10. The system of claim 9 wherein the varying of the commanded engine RPM is executed at a predetermined slew rate.

11. The system of claim 9 further comprising means for deengaging engine load upon determining that the difference between the commanded engine RPM signal and the actual engine RPM signal exceeds the predetermined threshold RPM value.

12. The system of claim 9 further means for declaring a bog condition upon determining that the difference between the commanded engine RPM signal and the actual engine RPM signal exceeds the predetermined threshold RPM value.

13. The system of claim 9 further comprising regulating means for controlling actual engine RPM relative to the commanded engine RPM.

14. The system of claim 13 wherein the regulating means comprises proportional plus integral regulating means.

15. The system of claim 14 further comprising means for setting a respective gain in the proportional-plus-integral means to a value consistent with expected engine load during bog recovery.

16. The system of claim 15 wherein the respective gain set in the regulator is a respective integrator gain.

17. The system of claim 11 further comprising means for reengaging engine load upon the difference between the actual engine RPM signal and the commanded engine RPM signal being restored to within a predetermined acceptable range.

18. A control system for controlling operation of an engine during a bog condition, the system comprising:

a sensor coupled to sense values of a commanded engine RPM signal;

a sensor coupled to sense values of an actual engine RPM signal;

a subtractor coupled to receive the respective sensed values of the actual and the commanded engine RPM signals to generate an output signal indicative of the difference between the commanded engine RPM signal the actual engine RPM signal;

a comparator coupled to receive the output signal from the subtractor and a predetermined threshold RPM value to determine whether the value of the output signal from the subtractor exceeds the predetermined threshold RPM value;

a module coupled to receive the respective values of the actual engine RPM signal to determine a minimum RPM point reached during the bog condition; and a control module configured to controllably vary the commanded engine RPM from a predetermined point about the minimum RPM point towards a desired commanded speed.

19. The system of claim 18 wherein the varying of the commanded engine RPM is executed at a predetermined slew rate.

20. The system of claim 18 further comprising a load-control submodule coupled to deengage engine load upon determining that the difference between the commanded engine RPM signal and the actual engine RPM signal exceeds the predetermined threshold RPM value.

21. The system of claim 18 further comprising a fault-declaring module configured to declare a bog condition upon determining that the difference between the commanded engine RPM value and the actual engine RPM value exceeds the predetermined threshold RPM value.

22. The system of claim 18 further comprising a regulator configured to control actual engine RPM relative to the commanded engine RPM.

23. The system of claim 22 wherein the regulator comprises a proportional plus integral control loop.

24. The system of claim 23 further comprising a gain setting module configured to set a respective gain in the proportional-plus-integral control loop to a value consistent with expected engine load during bog recovery.

25. The system of claim 24 wherein the respective gain set in the control loop is a respective integrator gain.

26. The system of claim 20 wherein the load-control module is further configured to reengage engine load upon the difference between the actual engine RPM signal and the commanded engine RPM signal being restored to within a predetermined acceptable.

* * * * *